June 16, 1925.
W. R. PRILIPP ET AL
1,542,581
TRACTOR DRAWBAR
Filed July 22, 1924
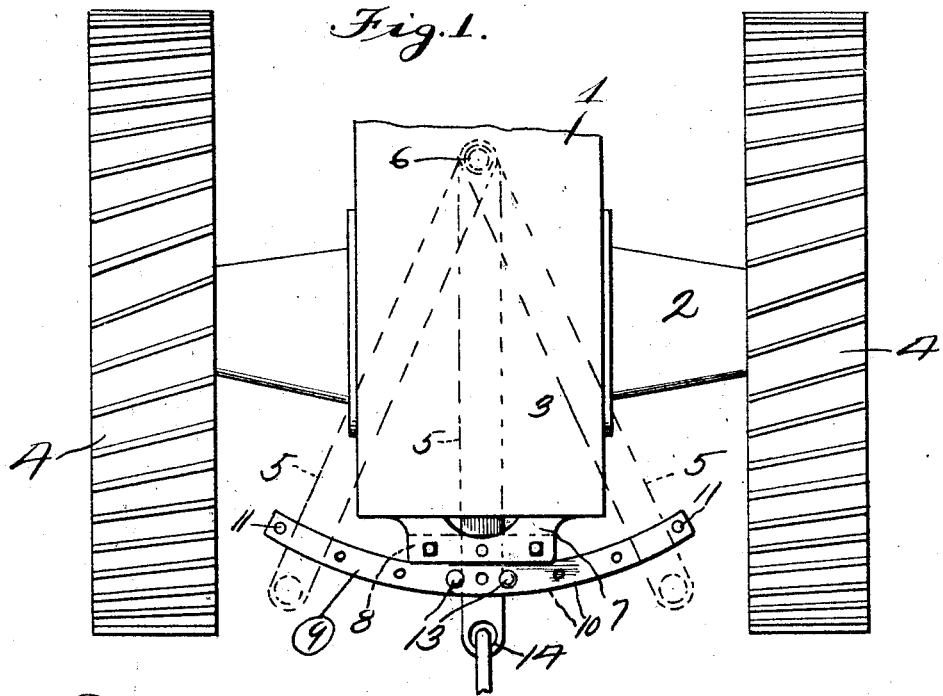
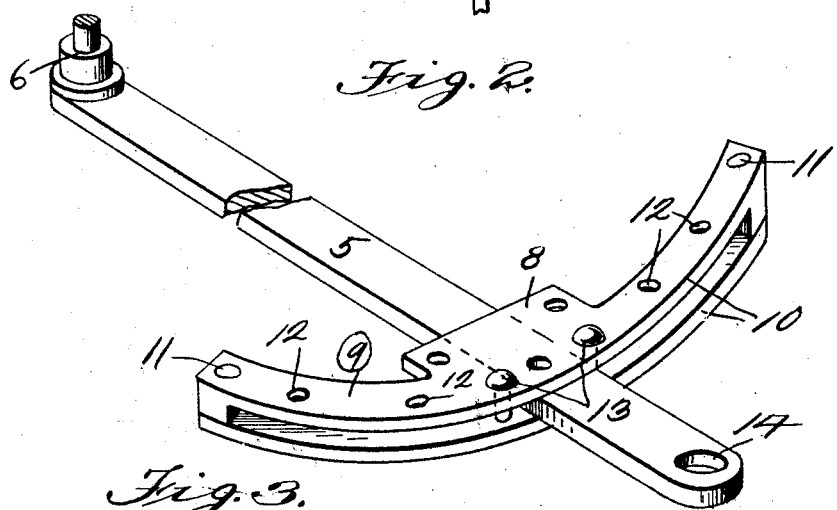
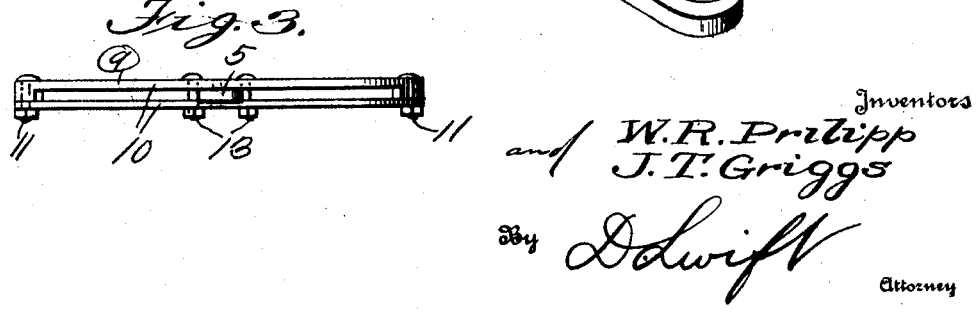
Inventors
W. R. Prilipp
J. T. Griggs
By D. Swift
Attorney Patented June 16, 1925.

1,542,581

UNITED STATES PATENT OFFICE.

WILLIAM R. PRILIPP, OF MESERVEY, AND JAY T. GRIGGS, OF GOODELL, IOWA.

TRACTOR DRAWBAR.

Application filed July 22, 1924. Serial No. 727,448.

*To all whom it may concern:*

Be it known that we, WILLIAM R. PRILIPP and JAY T. GRIGGS, citizens of the United States, residing at Meservey and Goodell, respectively, in the county of Hancock, State of Iowa, have invented a new and useful Tractor Drawbar; and we do hereby declare the following to be a full, clear, and exact description of the invention, such as will enable others skilled in the art to which it appertains to make and use the same.

The invention relates to tractor draw bars, and has for its object to provide a draw bar pivoted to the underside of the tractor below the axle thereof and forwardly of the axle, whereby when a draft is on the draw bar the tractor may easily and quickly turn without the side dragging of the forward end of the tractor as is now the common difficulty with the tractors where the draw bar is connected to the rear end of the tractor behind the axle.

A further object is to provide the differential casing with a horizontally disposed bracket, to which bracket is secured a segmentally shaped draw bar guide yoke in which the draw bar is guided in its horizontal movement, and to provide said yoke with means, whereby said draw bar may be held in various positions against movement by means of lugs or bolts extending through the yoke on opposite sides of the draw bar.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the rear end of a conventional form of tractor showing the draw bar applied thereto.

Figure 2 is a perspective view of the draw bar and yoke.

Figure 3 is a rear elevation of the draw bar and yoke.

Referring to the drawing, the numeral 1 designates a conventional form of tractor, 2 the rear axle housing thereof, which is carried by the differential casing 3 thereof, and 4 the drive wheels of the tractor. In tractors of this character as at present constructed draw bars are attached to said tractors rearwardly of the axle housing or a special hitch is provided rearwardly of the axle housing. However it has been found that where the draft is centered rearwardly of the axle housing, when making a turn there is a side dragging of the forward end of the tractor, and to obviate this difficulty the draw bar 5 is pivotally connected at 6 to the under side of the differential housing 3 forwardly of the axle housing 2, therefore it will be seen that the draft center will be forwardly of the axle and axle housing during a turning operation and the draft will facilitate the turning of the tractor and at the same time obviating the objectionable side dragging of the forward end of the tractor above referred to.

The differential casing 3 is provided with a bracket 7 which receives the horizontally disposed flange 8 of the draw bar guide yoke 9 which is horizontally disposed rearwardly of the differential casing 3 and is arcuate shaped and formed from registering arcuately shaped plates 10, the ends of which are secured together by means of bolts 11. The draw bar 5 is guided in its horizontal movement by the yoke 9, therefore it will be seen that a twisting action will not take place on the pivotal point 6 of the draw bar. Plates 10 which register with each other are provided with spaced apertures 12, between any of which the draw bar 5 may be placed and held by means of bolts 13 disposed on opposite sides of the draw bar, consequently the draw bar may be rigidly held at any angle desired without changing the center of draft at the point 6, and if desired the draw bar may be held in a longitudinal position in relation to the tractor as shown in Figure 1. The rear end of the draw bar is provided with an aperture 14, to which any kind of a vehicle or agricultural machine may be hitched in any suitable manner.

From the above it will be seen that a tractor draw bar is provided which is pivotally connected to the tractor forwardly of the axle thereby facilitating the turning operation of the tractor and obviating the side dragging of the forward end of the tractor during the turning operation. It will also be seen that a yoke is provided for guiding the draw bar in its horizontal movement and said yoke is provided with means whereby the draw bar may be held in longitudinal or angular position as desired.

The invention having been set forth what is claimed as new and useful is:—

The combination with the rear end of a pivoted tractor draw bar movable in a horizontal plane and extending beyond the rear side of a differential, of a guide bracket for the rear end of said draw bar, said guide bracket comprising horizontally disposed registering arcuate members, one of said members having its ends provided with downwardly extending integral spacing lugs engaging the other arcuate bar, the lug carrying bar being provided with a horizontally disposed integral extension, a horizontally disposed bracket carried by the differential casing and secured to the upper side of the extension and spaced pins extending through registering apertures in the arcuate bars at opposite sides of the draw bar.

In testimony whereof we have signed our names to this specification in the presence of two subscribing witnesses.

WILLIAM R. PRILIPP.
JAY T. GRIGGS.

Witnesses:
WARNER F. BETTS,
GEORGE E. SNEORBY.